Dec. 30, 1958 S. T. CARTER 2,866,534
ARTICLE-HANDLING APPARATUS
Filed June 19, 1957 4 Sheets-Sheet 2

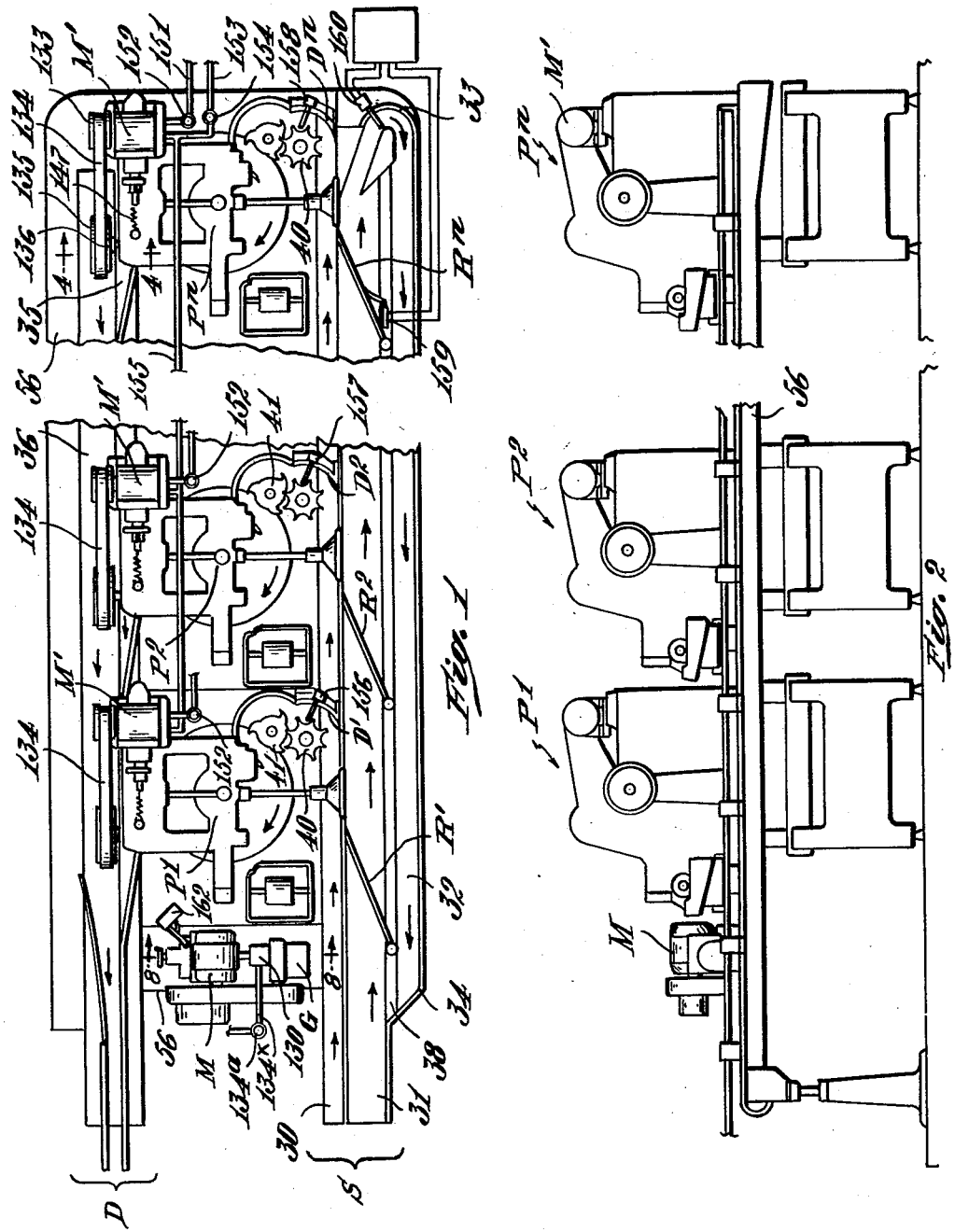

Inventor
Sidney T. Carter
by
Att'ys

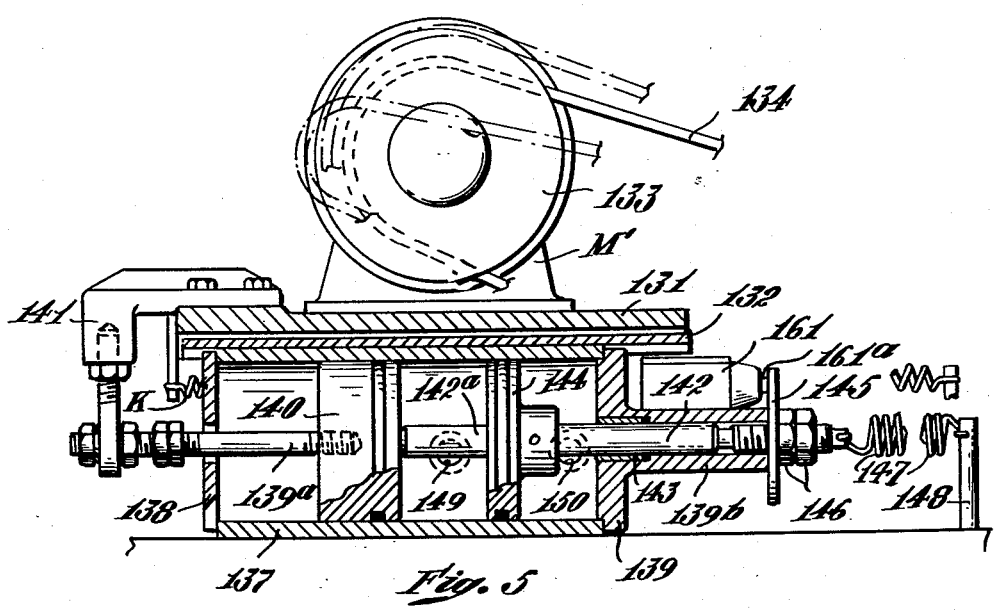
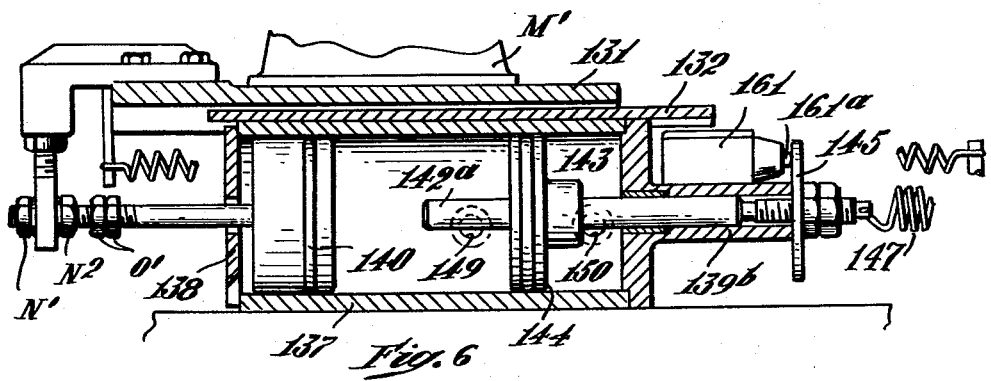
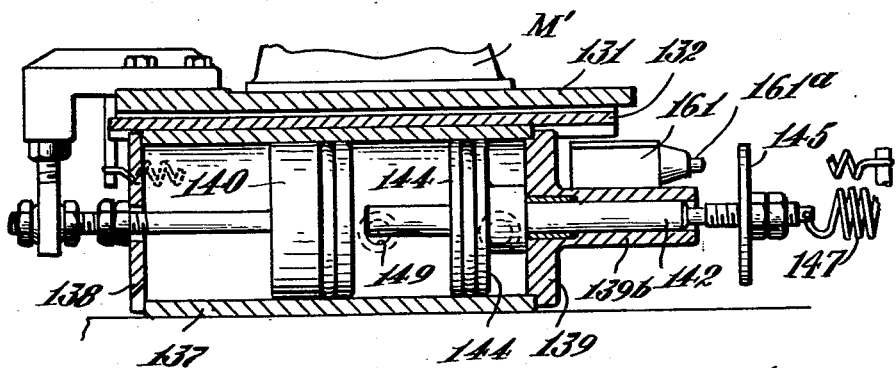

Inventor
Sidney T. Carter

United States Patent Office 2,866,534
Patented Dec. 30, 1958

2,866,534

ARTICLE-HANDLING APPARATUS

Sidney T. Carter, Shrewsbury, Mass., assignor to Geo. J. Meyer Manufacturing Co., Cudahy, Wis., a corporation of Wisconsin Application June 19, 1957, Serial No. 666,548

21 Claims. (Cl. 198—19)

This invention pertains to article-handling apparatus, including a plurality of article-processing units together with conveyor means for delivering articles to the several units and for taking processed articles away from the several units, and relates more particularly to automatic means for controlling the speed of each of the individual processing units and the speed of the supply and delivery conveyor means in such a way as to insure optimum effectiveness of the processing units.

While the invention is broadly useful with reference to the processing of articles of various kinds and, in general, regardless of the specific function of the processing units or whether or not all of the processing units have the same purpose or function, the invention is herein disclosed by way of example but without limitation as embodied in apparatus for applying labels to bottles, and wherein each of the processing units is a labeling machine, all said machines being the same type, and wherein the supply and delivery conveyor means are of the endless chain type providing horizontal surfaces on which the bottles stand upright as they advance toward or recede from the several labeling machines. Except for the novel speed control means for the conveyors provided by the present invention, the conveyors may be of generally conventional type, although the conveyor means disclosed, for example, in the copending application of Sidney T. Carter, Serial No. 416,562, filed March 16, 1954, for Conveyor Apparatus, now Patent No. 2,804,961, is especially desirable in that it provides for the controlled supply of articles to the several labeling machines. Thus, in the conveyor means disclosed in said application, the articles are advanced by the supply conveyor and automatically diverted to the first processing unit of the series in such numbers as said first unit can handle, and then after said first unit has reached its capacity, articles are supplied to the next unit of the series and so on, with provision for recirculating upon the conveyor itself such articles as pass the last processing unit without having first been diverted from the conveyor. However, assuming a constant supply of articles, if one of the processing units should stop, for instance for repairs, articles may accumulate upon the conveyor in excess of the space for their reception and a jam may result. One object of the present invention is to provide automatic means for increasing the speed of operation of the processing units beyond their normal speed, if articles pass the last unit of the series without being accepted by any of said units and in such numbers as to exceed the normal capacity of the conveyor to handle them. If, on the other hand, the supply conveyor should fail to present articles in sufficient numbers to supply all of the units of the series at full capacity, it is desirable, for economy in power consumption as well as for other reasons, to slow down the units which are not receiving articles, for example, those toward the end of the series, until articles are again supplied in sufficient quantity to justify the operation of the units at their normal capacity again.

While it is desirable to drive the delivery conveyor at the lowest practical speed, it is obviously necessary that it operate at such a speed as to carry away all of the articles as fast as they are processed, and thus if, as above suggested, the processing units are driven at abnormal speed at certain times, it is desirable that the delivery conveyor be likewise speeded up. A further object of the present invention is to provide means for increasing the speed of the delivery conveyor whenever articles are discharged at an abnormally high rate from the processing units.

Since the supply conveyor is capable of recirculating a certain number of articles, if they pass the last unit without being diverted from the conveyor, it is not necessary that the units be switched to high speed by the passing of a single article or even several articles beyond the last unit of the series, and thus, in accordance with the present invention, there is provided time delay means in the control device which normally initiates the high speed drive of the units, thereby to delay the initiation of high speed until the capacity of the conveyor for recirculating articles has been substantially reached. A further object is to provide means whereby, if as a result of the driving of the units at high speed, the supply of articles is so depleted that they are insufficient to supply all of the units at full capacity, such units as are not being supplied with articles will have their speed automatically reduced to the lowest or idling speed even though other of the units be still operating at full capacity.

A further object is to provide novel means for so coordinating the speeds of individual units of a series of processing units and a supply conveyor and delivery conveyor associated with said units, as thereby to insure optimum efficiency in operation of the assembled mechanism. Other and further objects and advantages of the invention will be pointed out in the following more detailed description and by reference to the accompanying drawings wherein:

Fig. 1 is a fragmentary plan view, showing three processing units which may constitute all, or a part only of the entire number of such units, each unit having its own individual drive motor; and, also showing the supply and delivery conveyors which serve these units;

Fig. 2 is a fragmentary elevation of the apparatus shown in Fig. 1;

Fig. 5 is a fragmentary section on the line 5—5 of Fig. 4, showing the control apparatus in the "normal" speed position;

Fig. 6 is a view similar to Fig. 5, but showing the speed control apparatus in the "idling" speed position;

Fig. 7 is a view similar to Fig. 5, but showing the parts in the "high or reserve" speed position;

Figure 3:
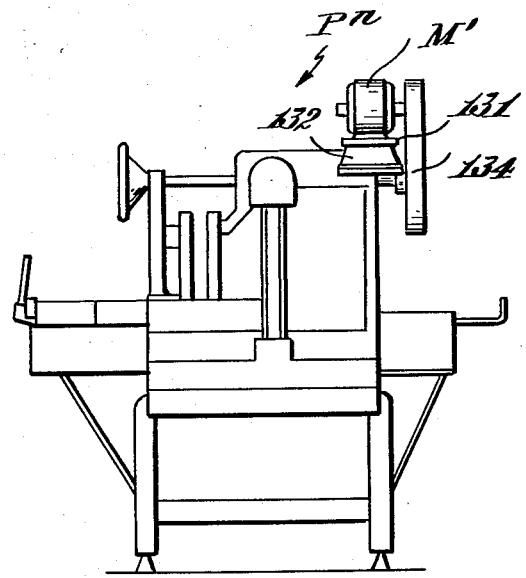
Fig. 3 is an elevation, omitting certain details, looking from the right-hand end of the apparatus of Fig. 1.
Figure 4:
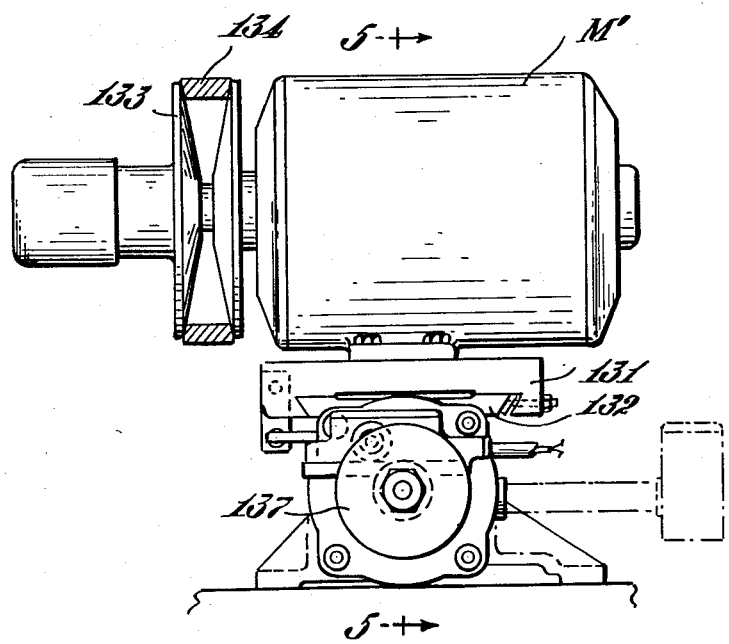
Fig. 4 is a fragmentary vertical section, partly in elevation, to larger scale, the section being on the line 4—4 of Fig. 1.

One desirable embodiment of the invention is shown diagrammatically in Figs. 1 and 2. For purposes of illustration, but without limitation, it may be assumed that this apparatus is for processing articles such as bottles, for instance, for delivering such bottles to a series of label-applying machines and for taking the labeled bottles away from the machines. In this connection, labeling machines are merely referred to as examples of processing units, all of the same character, and which perform some operation on the articles which are moved by the conveyor apparatus. Hereinafter, when reference is made to a "labeling machine" such designation is merely intended as illustrative of a particular kind of processing unit, and when reference is made to a "bottle," it is likewise to be understood that this is merely illustrative of any article which might be handled by the apparatus of the invention.

Referring to Fig. 1, the characters $P^1$, $P^2$ ... $P^n$ indicate processing units, all designed to perform the same operation, but three such units being illustrated in this view. However, the apparatus herein disclosed, with obvious change in dimension, is capable of use with a much larger number of processing units. The conveyor means for supplying or feeding articles to these units is designated generally by the character S (Fig. 1), while the conveyor means for taking the processed articles away from the processing units is designated generally by the letter D. The conveyor means for supplying or feeding the articles to the several processing units, as here illustrated by way of example, comprises a rear conveyor having a horizontal, article-supporting run 30, an intermediate conveyor having a horizontal, article-supporting run 31, and the front or return conveyor having the article-supporting run 32. Each of these article-supporting runs has a surface (for example, made up of a series of smooth metal plates) such that an article resting thereon may readily be slid transversely of the conveyor without tipping. The runs 30 and 31 move in the same direction and to the right as seen in Fig. 1, while the conveyor run 32 moves in the reverse direction, that is to say, to the left as seen in Fig. 1.

A stationary diverter $D1$, $D2$ ... $D^n$ is associated with each of the processing units $P1$, $P2$, etc, each diverter being so designed that any article resting upon the rear run 30 of the conveyor system, and which, when so resting on the rear conveyor run, approaches one or another of the diverters, is picked off from the conveyor run 30 and delivered to the corresponding processing unit.

The combined widths of the conveyor runs 30 and 31 is sufficient, at the receiving end of the apparatus, to accommodate a sufficient number of articles, when the conveyor runs are moving at the proper speed, to supply all of the processing units simultaneously when they are all working at maximum capacity. The articles may be delivered to this feeder conveyor system so that the articles move along in a disorderly mass, that is to say, without any attempt to dispose them in rows or tandem relation on the two conveyor runs 30 and 31 It will be noted that there is no dividing wall or walls between the adjacent edges of the runs 30 and 31 so that, except as hereinafter described, articles placed on the receiving ends of these two conveyor runs are free to move transversely across from one run to the other.

In order to assure the presentation to each of the diverters D, D1, etc. of a sufficient number of articles to supply any particular processing unit to its maximum capacity, there is provided, in advance of each diverter D1, D2, etc. an associated deflector R1, R2, etc. These deflectors normally extend across the run 31 in an inclined direction so that articles supported by the run 31, and advancing with the latter toward the right, when they engage one of these deflectors, are urged rearwardly toward the conveyor run 30. These deflectors, more fully described in the aforementioned application, Serial Number 416,562, are yieldable in response to abnormal pressure of articles against them so that they may flex or swing into a position where they are more nearly parallel to the direction of motion of the conveyor run. Thus, when as many articles have been deflected onto the run 30 as can be taken care of at any instant by the corresponding diverter, the associated deflector will swing or flex so that succeeding articles, moving along the conveyor run 31, will not be forced over toward the conveyor run 30 but may continue along the run 31 and pass that diverter which, for the instant, is receiving all of the articles which it can accommodate.

At the terminal end of the supply conveyor, that is to say, beyond the last diverter $D^n$ of the series, there is provided transfer means shown in Fig. 1 as comprising stationary elements including a curved guide 33 which is engaged by any article on the conveyor 31 which passes the last diverter $D^n$ without being removed from the conveyor run 30. This curved guide causes the article to move forwardly and onto the conveyor run 32, the latter, traveling reversely to the conveyor runs 30 and 31. As illustrated in Fig. 1, an article thus placed on the conveyor 32 travels backwardly until it nears the receiving or feed end of the apparatus where it is engaged by the switch end device 34 (shown in Fig. 1 as a part having a stationary, diagonal surface) which restores the article to the conveyor run 31 so that it mingles with the articles which are being delivered onto the latter conveyor run at the feed end of the machine and is carried along with such articles in the same way as though it had not previously traversed the length of the conveyor system.

As illustrated diagrammatically in Fig. 1, conveyors having runs 35 and 36 are arranged to receive articles from the several processing units D1, D2, etc. and to convey such articles toward the delivery end of the apparatus. Except for the means for driving these delivery conveyors at either of two different speeds, they may be conventional so that it is unnecessary to describe the conveyors 35 and 36 in further detail.

Referring to Fig. 1, which shows the right-hand and left-hand end portions only of the apparatus (the central portion of the apparatus being broken away), the supply conveyor runs 31 and 32 are shown as separated by a stationary "dead" plate 38 which extends longitudinally of the apparatus and which lies in the same horizontal plane as the several conveyor runs 30, 31 and 32. In Fig. 1, appropriate spacing and feeding means, including the rotary members 40 and 41, is associated with each diverter D1, D2, etc. for assuring the proper delivery of the articles from the diverter to the processing unit.

Figure 8:
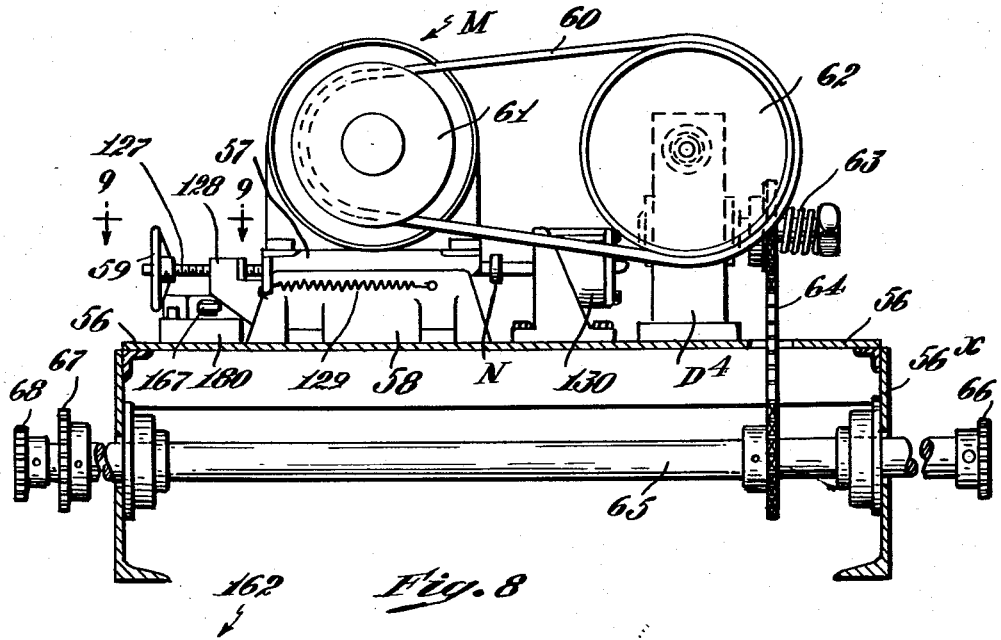
Fig. 8 is a vertical section, substantially in the plane of the line 8—8 of Fig. 1.

Referring to Figs. 1 and 8, the numeral 56 designates a support or table, forming a part of the machine frame, on which the drive motor M and reduction gear mechanism G for driving the several conveyor chains are mounted.

As illustrated in Fig. 8, the conveyor drive motor M is mounted on a carriage 57 which is guided for transverse movement on a block 58 mounted on the support 56. By means to be described, the motor may be moved transversely of the machine for varying the tension of the belt 60 which passes about a pulley 61 on the motor shaft and about a pulley 62 on the shaft of the reduction gearing device $D^4$ which may be of any conventional type. Desirably, the pulleys 61 and 62 are of the type used in a so-called "Reeves" drive such that by varying the tension of the belt 60, the speed of the shaft of the pulley 62 may be varied. The delivery shaft of the reduction gearing mechanism drives a shaft (through an interposed friction clutch device including the spring 63) on which is mounted a sprocket wheel over which an endless sprocket chain 64 is trained, this chain also passing about a sprocket wheel on the transverse shaft 65 which is mounted in bearings in the front and rear longitudinal rails of the machine frame.

At its forward end, and forwardly of the front frame rail $56^x$, the shaft 65 is provided with a sprocket wheel 66 about which is trained the chain (not shown) of the return conveyor having the upper run 32. Sprockets 67 and 68 on the rear end of shaft 65 drive the chains (not shown) which carry conveyor runs 35 and 36.

At the right-hand or terminal end of the apparatus, as more fully shown in the above-mentioned application, Serial Number 416,562, the chains of the delivery conveyors 35 and 36 (Fig. 1) are trained about sprocket wheels (not shown) on a transversely extending shaft on which is mounted a gear which meshes with a gear on a parallel shaft which extends forwardly and which is provided on its forward end portion with sprockets about which the chains of the conveyors 30 and 31 are trained. Thus, the conveyors 30 and 31 move oppositely to the conveyors 32, 35 and 36.

The numeral 127 (Fig. 8) indicates the usual adjusting rod or shaft of the Reeves variable speed drive whereby the motor is usually moved by hand, by turning the hand wheel 59, so as to tension the belt 60, more or less, and thus vary the speed of the driven pulley 62. However, in the present instance, the hole in the stationary part 128 is reamed out so that the screw-threaded part of the rod or shaft 127 can slide freely through it. The hand wheel 59 may be adjusted along the screw-threaded end portion of the rod 127 and constitute a switch-actuating element, as hereafter described. A long tension spring 129 (Fig. 8) is connected at one end to the motor carriage 57 and at its other end to the base 58 and is so arranged that it constantly tends to move the motor carriage to the right and thus to increase the speed of the driven pulley 62. At its right-hand end (as viewed in Fig. 8), the rod 127 extends into a pneumatic cylinder 130 which is mounted on the table 56 of the machine. In this cylinder, there is arranged a piston (not shown) which is secured to the end of the rod 127—the latter passing through an opening in the left-hand cylinder head. A pipe 134ˣ (Fig. 1) enters the right-hand end of the cylinder (as viewed in Fig. 8) and provides for admission of compressed air, for example at a pressure of twenty pounds per square inch, into the cylinder at the right-hand side of the piston. When compressed air is thus admitted to the cylinder, the shaft 127 is moved to the left, thus moving the motor to the left and decreasing the speed of the pulley 62. A nut N (Fig. 8), adjustable along the shaft 127, provides a stop to fix the minimum speed. The means for controlling the admission of air into the cylinder 130 will be described in detail hereafter.

In accordance with the present invention, provision is made for driving each individual processing unit at either of three predetermined speeds and for driving the conveyor means at either of two predetermined speeds. Change from one to the other of these speeds during operation of the machine is automatic, but the speeds to be available for such automatic control may be predetermined and the parts initially adjusted by the mechanic to provide for the speeds desired.

The automatic variation in speed of each unit is accomplished, as herein shown, for example, by the use of a cylinder to which compressed air is admitted and from which it is exhausted in accordance with the setting of suitable electrically actuated valves. Since the speed control for each of the several processing units is substantially the same, it suffices to describe this control as associated with the last unit $P^n$.

Referring to Figs. 1 and 2, the drive for the unit $P^n$ comprises an electric motor M' which is mounted on a carriage 131 (Figs. 5, 6 and 7) guided to slide from right to left (Fig. 5) on a base 132 forming a part of the machine frame. A pulley 133 is fixed to the motor shaft and is embraced by an endless belt 134 (Figs. 1 and 5) which also embraces a pulley 135 on the shaft 136 of the unit which is to be driven. The pulleys 133 and 135 and the belt 134 are of the kind commonly employed in a so-called "Reeves" drive. In such an arrangement, tightening or slackening of the belt by bodily movement of the motor results in changing the speed of the driven shaft 136. Obviously, if desired, conventional speed-reducing means may be interposed between the respective shafts 136 and the machines to be driven.

The means for shifting the motor, thereby to vary the speed of the processing unit, comprises a cylinder 137 (Figs. 5, 6 and 7) arranged beneath the support 132 for the motor carriage. This cylinder has heads 138 and 139 at its opposite ends—the head 138 having a central opening through which passes (with clearance) a piston rod 139ª whose inner end is fixed to the piston 140. The outer end of the rod 139ª is attached, with provision for adjustment, to a bracket 141 fixed to the motor carriage 131. Thus, motion of the piston 140 lengthwise of the cylinder moves the motor thereby to tighten or loosen the belt 134. The other cylinder head 139 has a centrally located, outwardly projecting sleeve portion 139ᵇ constituting a guide for a second piston rod 142. Desirably, packing 143 is arranged to prevent leakage of pressure fluid along the rod 142. A piston 144 in the cylinder 137 is attached to the rod 142, the latter projecting through the piston to provide the limiting stop element 142ª. At its outside end, the piston rod 142 is screw-threaded and provided with a switch-actuating disc 145 whose position longitudinally of the rod may be adjusted and fixed by means of nuts 146. A tension spring 147 is attached at one end to the rod 142 and at its opposite end to a fixed anchorage member 148 (Fig. 5), the spring being so designed as to tend to move the rod 142 and the piston 144 to the position shown in Fig. 7.

The cylinder 137 has two ports 149 and 150 in its side wall, the port 150 being near the cylinder head 139 and the port 149 being between the pistons 140 and 144 and spaced to the left of the port 150 as shown in Figs. 5, 6 and 7, being located, as here shown, approximately two-fifths of the length of the cylinder from the head 139. A spring K (Fig. 5) tends to move piston 140 and the motor carriage 131 to the right.

A pipe 151 (Fig. 1) supplies compressed air at, for example, twenty pounds per square inch to the port 149 of the speed control cylinder 137 of each respective processing unit, the admission of air to each cylinder being controlled by a corresponding electrically actuated three-way valve 152. A pipe 153 supplies air at, for example, forty pounds per square inch to an electrically actuated three-way valve 154. When this valve is open, air from pipe 153 is delivered to a pipe 155 having branches which conduct the air to the ports 150 of all of the processing units. The valves 152 and 154 are, for example, solenoid-actuated valves.

Switches 156, 157 and 158 (Fig. 1) are associated with the diverters D'—Dⁿ of the respective processing units, these switches being so arranged that a bottle, in entering any processing unit, will actuate the corresponding switch. Each of these switches is in circuit with the solenoid which operates the corresponding valve 152.

A switch 159 (Fig. 1) is associated with the last deflector Rⁿ of the series and a switch 160 is arranged to be actuated by an article in moving along the guide 33 from conveyor 31 to conveyor 32. A switch 161 (Figs. 5, 6 and 7) is associated with each of the speed control cylinders 137, each such switch having an actuator button 161ª arranged to be engaged, at times, by the switch-actuating disc 145 fixed to the corresponding piston rod 142.

Figure 9:
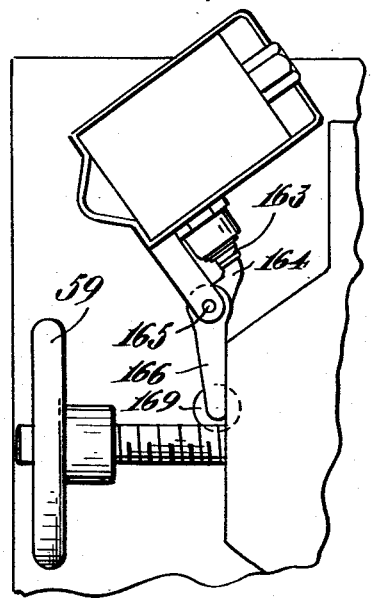
Fig. 9 is a fragmentary plan view, looking downwardly toward the plane of line 9—9 of Fig. 8; and, Fig. 10 is a wiring diagram showing an electrical circuit employed in operating the apparatus.

A switch 162 (Figs. 1 and 9) is associated with the cylinder 130 which controls the speed of the conveyors. This last-named switch (Fig. 9) has an actuator button 163 which is operated by the short arm 164 of a lever pivoted at 165 to a fixed part and which has a long arm 166 provided with a roller 167 so located as to be contacted by the hub of the hand wheel 59 which supports the motor M when the latter has moved a predetermined distance to the right as viewed in Figs. 8 and 9.

If the switch 156, for example, be closed (no articles entering the processing unit P'), current is supplied to the corresponding valve 152 which admits air between the pistons 140 and 144. Piston 140 then moves to the left (idling position, Fig. 6). If now articles enter the processing unit P', switch 156 opens, breaking the circuit to the corresponding valve 152. Valve 152 then shifts to exhaust air from the space between the pistons, allowing the spring K (Fig. 5) to move the piston 140 to the right (normal speed). In the meantime, normally closed switch 161 has been supplying current to valve 154 and high pressure air has been admitted to the right of piston 144—pushing the latter over to the normal speed position (Fig. 5) where part 142a acts as a limiting stop for piston 140, it being noted that the motion of piston 144 to the left (Figs. 5 and 6) is limited by the contact of disc 145 with the end of guide 139b.

Figure 10:
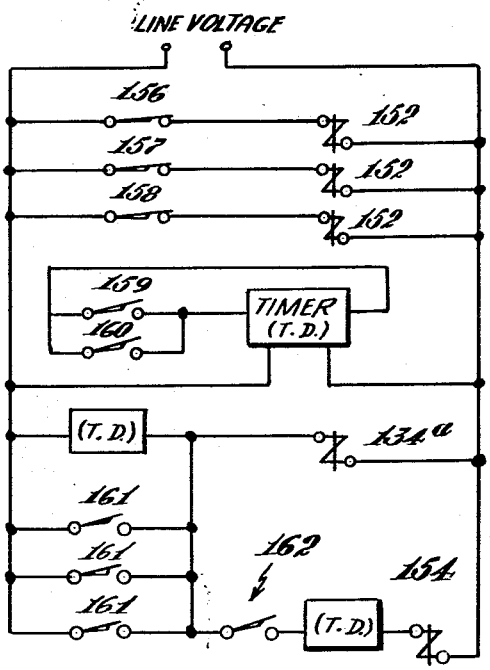

As articles begin to pass either of the normally open switches 159 or 160, one or both of these switches is closed and current is supplied to the valve 134a (Fig. 1) which then is positioned to exhaust air from the cylinder 130 (Fig. 8) of the conveyor drive motor, allowing the spring 129 to move the motor M to high speed position. When motor M reaches high speed position, the normally open switch 162 (Fig. 9) is closed by contact of the hub of hand wheel 59 with roller 167, thus supplying current and shifting the valve 154 (Fig. 1) to open the ports 150 of all of the cylinders to the atmosphere, thus allowing the respective springs 147 (Fig. 1) to move the pistons 144 to the right, thus allowing springs K to move pistons 140 to the right, together with the motors M', thus driving each processing unit at high speed. When, by reason of this high speed, articles no longer pass the switches 159 and 160, the circuit to valve 154 is broken and this valve now allows high pressure air to enter each of the cylinders 137, thus returning each processing unit to normal speed. However, since the switches 161 are all connected in parallel (Fig. 10), all of the units must be restored to normal speed before the circuit of valve 134a is broken so as to allow the conveyor motor M to return to normal speed.

If, while the switches 159 or 160 are closed and the machine, as a whole, is running at high or reserve speed, any one of the individual switches 156 opens, its particular processing unit will return to idling speed before the speed of the other units is reduced.

Figs. 5, 6 and 7 show the speed control means positioned for normal or operating speed, low or idling speed, and high or reserve speed, respectively. Assuming that the pipes 151 and 153 are supplied with air at the desired pressure (the pressure in the pipe 153 desirably being approximately twice that in the pipe 151) and that each of the solenoid actuated valves 152 is open, air at the lower of the two pressures has been admitted through ports 149 to the space between the pistons 140 and 144 of each cylinders 137. The pressure of this air, acting on the piston 140 forces the latter to the left, thus shifting the motor carriage to the left—that is to say, toward the low speed position. The air pressure acting on the piston is sufficient to overcome the spring K (Fig. 5) which constantly tends to shift the motor carriage to the right—that is to say, toward the high speed position, and also to overcome the spring (not shown) which is an element of the conventional "Reeves" pulley. Piston 140 moves to the left until it contacts the cylinder head 138. Under the same conditions, the solenoid-actuated valve 154 has allowed air at the higher pressure to enter each of the ports 150, forcing the pistons 144 to the left—that is, toward the low speed position. Such movement of the piston 144 is limited by contact of the disc 145 with the end of the guide sleeve 139b. The processing units are now all driven at the idling or low speed.

If now the solenoid valve 152 be moved to cut off air from the supply pipe 151 and, at the same time, to open port 149 to the atmosphere, the pressure between the pistons is released and the spring K, together with the spring of the Reeves drive, will move the motor carriage to the right—that is to say, toward the high speed position. The speed of the processing unit is thus increased until the piston 140 is stopped by contact with the part 142a (it being remembered that high air pressure is still maintained to the right of the piston 144). The apparatus now operates at the normal or working speed.

If valve 154 be now moved to shut off air from the pipe 153 and to open the ports 150 to the atmosphere, the springs 147 will pull the pistons 144 to the right until the hub portion of each piston contacts the cylinder head 135, thus allowing the spring K and the Reeves pulley spring to move the piston 140 and the motor carriage to the right until such motion is limited by contact of the nuts O' (Fig. 6) with the outer surface of the cylinder head 138, the motors M' now being in the high speed position.

Thus, by the control of the valves 152 and 154, the processing units may be operated at either of three definite predetermined speeds—to wit, the idling speed, the normal speed and high speed.

As above described, a switch 156, 157 and 158 is located in the entrance to each respective processing unit in such a position that an article entering the unit will actuate the switch. Each of these switches in connected in series with the corresponding solenoid-actuated switch 152. When any one of the switches 156, 157 or 158 is closed by contact of a passing bottle, its corresponding solenoid valve is thereby set to allow air to exhaust from the space between the pistons of the corresponding control cylinder, thus speeding up the corresponding unit to normal or working speed. So long as bottles are fed in a steady stream to the processing unit, the speed of the unit will remain constant; but, if the supply of bottles to any given unit be intermitted, the corresponding switch 156, 167, etc. will open and, by such action, air will be admitted by the corresponding solenoid valve to the space between the pistons, thus moving the motor carriage to the idling position.

During either the idling or the normal operating position, the valve 154 is open, maintaining pressure at the right-hand side of piston 144. However, if bottles, in substantial number, begin to pass the deflector R$^n$ or to move along the guide 33 (said bottles having passed the last processing unit without having been diverted from the conveyor 32) one or the other of the switches 159 or 160 will close. Closure of either one of these switches so sets the solenoid valve 134a as to allow air to exhaust from the cylinder 130, whereupon the spring 129 and the spring of the corresponding Reeves pulley will shift the carriage of the motor M to high speed position so that the conveyors, which normally run at the minimum effective speed, will now run at high speed. This movement of the motor carriage so actuates switch 162 that the solenoid valve 154 is moved to allow air to exhaust from the cylinders of the speed control devices of all of the processing units (it being noted that the opening of the valve 154 permits air to flow through the pipe 155 to all of the processing units). Thus, all of the processing units will now run at high speed. When the processing units, running at high speed, are taking substantially all of the bottles so that few, if any, bottles are passing the deflector R$^n$ or the guide 33, the switches 159 and 160 will open and break the circuit through the solenoid switch 154, allowing air to enter the control cylinder of each of the several processing units through their ports 150, thus returning the piston 144 to the position shown in Fig. 5. Such movement of piston 144 pushes the piston 140 over to the position shown in Fig. 5 in opposition to the spring K, thus moving the motor carriage to normal operating speed position. However, because the switches 161 of the several processing units are in parallel, all of these switches must be open before solenoid valve 134a will be actuated to permit the return of the conveyor drive to normal low speed.

The circuit which is controlled by the switches 159 and 160 comprises a time-delay relay so that even though a few bottles may pass the last deflector R$^n$ or move along the guide 33, the apparatus need not necessarily go up to high speed. However, when bottles begin to pass the deflector or the guide 33 in substantial numbers, the time delay will no longer be effective to prevent the machine from going up to high speed.

Since the control for the idling speed operates independently of the control of the reserve speed, it is possible for the machine to be running at high speed and, before the machine as a whole, is returned to normal speed, the first or second unit, for example, of the series might run out of bottles. However, when this happens, any unit which is not being supplied with bottles will automatically return to the idling speed.

To summarize the operation by reference to the wiring diagram (Fig. 10), the circuit through the switches 161 is open when the processing units are running at normal speed. In shifting from normal to high speed, the sequence of operations is as follows:

If either switch 159 or 160 is closed by the passing of an article, the timer device is energized and, after a certain delay, its two contacts close. When these contacts close, valve 134a is thereby set to allow air to exhause from the cylinder 130 and the conveyor motor M is then moved to the high speed position. As the conveyor reaches high speed, the hand wheel 59 on the base motor M closes the switch 162, thus immediately setting valve 154 to allow air to exhaust from the cylinders 137 of the processing units and the motors of these several units move to the high speed position. When any one of the processing units is running at high speed, the corresponding disc 145 is so spaced from the actuating button 161a of its switch 161 that said switch is closed.

The sequence in operations, is going from high speed to normal speed is as follows:

Both switches 159 and 160 must be open, thus deenergizing the timer and opening the timer contacts. This immediately deenergizes the valve 154 and the several processing units then return to normal speed. As each unit reaches the normal speed position, the corresponding disc 145 opens its switch 161. As these switches are connected in parallel, they must all be opened before the valve 134a will deenergize. When the valve 134a deenergizes, the conveyor then returns to normal speed, opening the switch 162 and thus the entire system is at normal speed, it being noted that at normal speed all of the switches 161 are open and the switch 162 is also open; while, at high speed, all of the switches 161 are closed and the switch 162 is closed.

While the normal conveyor speed is desirably kept low, the delivery conveyor must be moved fast enough to take the articles away from the processing units as fast as they are ready for delivery.

However, it is obvious that if the processing units are speeded up, the delivery conveyor must likewise be speeded up to insure the proper removal of the articles from the processing units. For the same reason, it is essential to slow down the processing units before the delivery conveyor is slowed down. It is not particularly important that the supply conveyor is speeded up at the same time as the delivery conveyor, but in machines employing a large number of processing units, it is customary to drive the supply conveyor by an independent motor and, under those circumstances, the supply conveyor will not be speeded up at the same time as the delivery conveyor.

While one desirable embodiment of the present invention has herein been disclosed by way of example and illustration, it is to be understood that the invention is broadly inclusive of any and all modifications falling within the scope of the appended claims.

I claim:

1. In combination with a plurality of processing units and constantly moving conveyor means for delivering articles to the several units, drive means for each individual unit, said drive means including a constant speed motor and motion-transmitting means between each motor and its respective processing unit, the drive means being constructed and arranged to drive the respective processing unit at any of three different, predetermined speeds, and control means for each drive means, the control means being automatically operative to cause any individual processing unit to shift from normal speed to a low, idling speed if the moving conveyor fails to deliver articles to said processing unit.

2. In combination with a plurality of processing units and constantly moving conveyor means for delivering articles to the several units, a constant speed motor for driving each individual unit, and motion-transmitting means between each motor and its respective processing unit, said motion-transmitting means being constructed and arranged to drive its processing unit at any of three different, predetermined speeds, and control means for each motion-transmitting means, said control means being operative to cause all of the processing units concomitantly to shift from normal speed to high or reserve speed if the conveyor means presents articles at a rate such that a substantial number of articles pass the last processing unit of the series without having been diverted to any of the processing units.

3. The combination according to claim 2 comprising delivery conveyor means for removing articles from the several processing units after they have been processed, means operative to drive the delivery conveyor means at either of two predetermined definite speeds, and means operative to shift the delivery conveyor means from normal speed to high speed concomitantly with the shift of the processing units from normal to high speed.

4. In combination, in apparatus wherein articles are supplied by constantly moving conveyor means to each of a series of processing units each of which is driven by an individual motor through variable speed, motion-transmitting means designed to drive each processing unit at any of three definite predetermined speeds, to wit, low, normal and high speed, respectively; control means operative to determine at which of said speeds any individual unit is to be driven, said control means being automatically operative to shift any individual processing unit from normal speed to low speed in the even of interruption in the delivery of articles to said individual unit, and to shift all of the processing units simultaneously to high speed in the event that articles are supplied by the conveyor means faster than they can be processed by all of the processing units operating at normal speed.

5. In combination, in apparatus wherein articles are supplied by constantly moving conveyor means to each of a plurality of processing units each of which is driven by an individual motor through variable speed, motion-transmitting means designed to drive each processing unit at any of three definite predetermined speeds, to wit, low, normal and high speed, respectively, control means operative to determined at which of said speeds any individual unit is to be driven, said control means comprising a switch located at the entrance to each processing unit, respectively, and which, when held in normal position by contact of articles entering said processing unit, is operative to initiate operation of said unit at normal speed, and a second switch positioned to be contacted by articles moving with the conveyor means at a location beyond the last processing unit of the series and operative, by the passing articles, to cause all processing units to shift from normal to high speed simultaneously.

6. In combination, in apparatus wherein articles are supplied by constantly moving conveyor means to each of a series of processing units each of which is driven by an individual motor through variable speed, motion-transmitting means designed to drive each processing unit at any of three definite predetermined speeds—to wit, low, normal and high speed, respectively, control means operative automatically to determine at which of said speeds any individual unit is to be driven, said control means comprising a movable part whose position determines the speed of the processing unit, a cylinder having therein a piston, means connecting the piston to said movable part, the cylinder having a port for the passage of pressure fluid, means responsive to interruption in the delivery of articles to the processing unit to admit pressure fluid to the cylinder thereby to move the piston in a direction to dispose said movable part at the low speed position, means tending to move the piston in the opposite direction, and adjustable stop means for limiting motion of the piston in the latter direction.

7. The combination, according to claim 6, wherein the adjustable stop means for limiting motion of said piston comprises a second piston within the same cylinder and means for admitting pressure fluid to the cylinder for moving said second piston toward the first piston and to a predetermined position within the cylinder.

8. The combination, according to claim 1, wherein the motor is bodily movable in a rectilinear path, and the motion-transmitting means is so constructed and arranged as to vary the position of the motor thereby to vary the speed of the processing unit, the control means comprising a cylinder having a piston therein and means for transmitting motion from the piston to the motor for positioning the latter to vary the speed of the processing unit, the cylinder having therein a port for the passage of pressure fluid, valve means for determining the admission to or exhaust of pressure fluid from the cylinder, and means for so actuating said valve that, upon interruption in the delivery of articles to the processing unit, pressure fluid will be admitted to the cylinder to dispose the piston and motor at the low speed position.

9. The combination, according to claim 1, wherein the motor is bodily movable in a rectilinear path, and the motion-transmitting means is so constructed and arranged as to vary the position of the motor thereby to vary the speed of the processing unit, the control means comprising a cylinder having two individual pistons therein, the cylinder having two ports for the passage of pressure fluid, one port being located between the first and second pistons and the other at the outer side of the second of the pistons, means for transmitting motion from the first of said pistons to the motor for positioning the latter thereby to determine the speed of the processing unit, two valves each operative to control the admission to and exhaust of pressure fluid through a corresponding one of the respective ports, means for so actuating the valve which controls the port which is located between the pistons that upon interruption in the delivery of articles to the processing unit, pressure fluid will be admitted to the space between the pistons, thereby moving the first piston to dispose the latter motor in low speed position, and the second valve being normally so set as to admit pressure fluid from a high pressure source to act on the second piston so as to move it toward the first piston, and means for positively limiting such motion of the second piston.

10. The combination, according to claim 9, including means tending to move the second piston away from the first, and means for setting the second of said valves to exhaust pressure fluid from the cylinder and allow the second piston to move away from the first piston whenever articles are supplied to the several processing units at a rate greater than they can be handled by the processing units when operating at normal speed.

11. The combination, according to claim 1, wherein the drive means for each processing unit is of the Reeves variable-speed type in which the motor is bodily movable to change the speed of the processing unit, the control means comprising an elongate cylinder having two independent pistons therein, means connecting one of the pistons to the motor whereby the motor is moved in one direction by fluid pressure acting on the piston, spring means tending to move the motor in the other direction, the cylinder having a fluid flow port located between the pistons and a second fluid flow port located between the second piston and the adjacent end wall of the cylinder, means for supplying pressure fluid at a relatively low pressure to the first-named port, and means for supplying pressure fluid at a higher pressure to the second port, an electrically actuated three-way valve for determining the admission to or exit of pressure fluid from the cylinder through each respective port, means normally operative to set the valve which controls the port between the pistons so as to exhaust pressure fluid from the cylinder thereby to permit the spring to move the motor toward normal speed position, means normally operative to set the valve which controls the second port to admit pressure fluid to move the second piston toward the first, and positive means operative to limit such motion of the second piston whereby the latter acts as a stop to hold the first piston at a definite location corresponding to normal speed of the processing unit.

12. The combination, according to claim 11, comprising means operative, in response to the supply of articles faster than they can be processed by all of the units operating at normal speed, so to set the second valve as to exhaust air from the cylinder so that the spring then becomes operative to move the second piston away from the first thereby allowing the latter, in response to its actuating spring, to shift its motor to high speed position.

13. The combination, according to claim 11, wherein the second-named port of the control cylinder of each of the several units of the series is supplied with pressure fluid from the same source and under control of a single valve, means operative, in response to the supply of articles, faster than they can be processed by the several units when operating at normal speed, so to set said last-named valve as to exhaust pressure fluid from the several cylinders simultaneously, and spring means operative thereupon to move the second-named piston in each of the respective control cylinders away from the first piston thereby allowing the latter, in response to its actuating spring, to move its motor to high speed position.

14. The combination, according to claim 13, wherein there is associated with each control cylinder a conveyor control switch which is open except when its corresponding processing unit is running at high speed, said switches of the several control cylinders being in parallel in a circuit which controls means for determining whether the delivery conveyor is to run at low or high speed, and means operative to close the switch of any of said control cylinders whenever the second-named piston in said cylinder moves into high speed position.

15. The combination, according to claim 13, wherein the delivery conveyor is driven by a Reeves-type speed changer including a motor which is movable bodily from a high speed to a low speed, the control means for the conveyor comprising a cylinder having therein a piston so connected to the motor that motion of the piston by fluid pressure moves the motor, the cylinder having a port for the passage of pressure fluid, an electrically actuated valve for admitting pressure fluid to the cylinder through said port thereby to move the piston to high speed position, spring means tending to move the piston in the opposite direction, said electrically actuated valve being in series with each of the several parallel control switches, and a normally closed switch which is closed when the delivery conveyor motor reaches the high speed position, said switch being in circuit with the valve which exhausts pressure fluid from the control cylinders of the several processing units thereby to shift the latter to high speed.

16. In combination of the apparatus of the class described wherein each of the series of processing units is provided with an individual, variable-speed drive including a movable speed-regulating part which may be set in any of three different positions thereby to cause the respective unit to run at low, normal or high speed, respectively, said speed-regulating part being normally set to cause the several processing units to run at normal speed, a conveyor for supplying articles to the several units and a conveyor for removing articles from the several units, drive means operative to move the latter conveyor at either of two predetermined speeds, and control means for the latter drive means including a movable part which may be set in either of two different positions thereby to cause the delivery conveyor to run either at low or high speed, respectively, said last-named movable part being normally set to cause the delivery conveyor to run at low speed, and control means operative, in the event that the supply of articles to any one of the processing units is interrupted while the apparatus is running at normal speed to shift the movable speed-regulating part of said individual unit to the low speed position without changing the speed of the other units.

17. The combination, according to claim 16, wherein the control means is operative, in the event that articles are advanced by the supply conveyor at a rate faster than they can be processed by the several units operating at normal speed, first to shift the delivery conveyor to high speed and then, simultaneously, to shift all of the processing units to high speed.

18. The combination, according to claim 16, wherein the control means for the several processing units is so constructed and arranged that if, while the delivery conveyor is running at high speed, the supply of articles to one of the processing units should be interrupted, said unit will automatically be shifted to low speed without decreasing the speed of the other units.

19. The combination, according to claim 16, wherein the control means comprises a delay device operative to permit shifting to high speed only when a predetermined number of articles have passed the last processing unit without having been diverted from the supply conveyor.

20. The combination, according to claim 16, wherein the control means is operative to prevent shift of the delivery conveyor when running at high speed to a lower speed so long as any of the processing units is running at high speed.

21. The combination, according to claim 16, wherein the control means is operative first to shift the delivery conveyor to high speed and then to shift all of the processing units simultaneously to high speed.

References Cited in the file of this patent
UNITED STATES PATENTS 2,289,186    Flint _____ July 7, 1942